United States Patent
Chou et al.

(10) Patent No.: US 9,368,794 B2
(45) Date of Patent: Jun. 14, 2016

(54) LIFEPO4 FLAKES FOR LI-ION BATTERY AND METHOD FOR MANUFACTURING THE SAME

(75) Inventors: Lih-Hsin Chou, Hsinchu (TW); Kuei-Chao Wu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 318 days.

(21) Appl. No.: 13/529,221

(22) Filed: Jun. 21, 2012

(65) Prior Publication Data

US 2012/0328947 A1    Dec. 27, 2012

(30) Foreign Application Priority Data

Jun. 22, 2011  (TW) ............................ 100121791 A (51) Int. Cl.
| | |
|---|---|
| *H01M 4/58* | (2010.01) |
| *B82Y 30/00* | (2011.01) |
| *B82Y 40/00* | (2011.01) |
| *C01B 25/45* | (2006.01) |
| *H01M 10/0525* | (2010.01) |

(52) U.S. Cl.
CPC ............. *H01M 4/5825* (2013.01); *B82Y 30/00* (2013.01); *B82Y 40/00* (2013.01); *C01B 25/45* (2013.01); *H01M 10/0525* (2013.01)

(58) Field of Classification Search
None
See application file for complete search history.

(56) References Cited

U.S. PATENT DOCUMENTS

| | | |
|---|---|---|
| 2008/0241690 A1 | 10/2008 | Delacourt et al. |
| 2008/0292522 A1 | 11/2008 | Kim et al. |

FOREIGN PATENT DOCUMENTS

| | | | | |
|---|---|---|---|---|
| CN | 101327920 B | * | 8/2010 | ............. C01B 25/45 |
| WO | WO2007058432 | | 5/2007 | |

OTHER PUBLICATIONS

Jean-Marie Tarascon, Nadir Recham, Michel Armand, Jean-Noël Chotard, Prabeer Barpanda, Wesley Walker, and Loic Dupontfor, "Hunting for Better Li-based Electrode Material via Low Temperature Inorganic Synthesis," Chemistry of Materials Review; 2010, 22, p. 724-739.

C. Delacourt, P. Poizot, Levasseur and C. Masqueliera, "Size Effects on Carbon-Free LiFePO4 Powders The Key to Superior Energy Density," Electrochemical and Solid-State Letters; 9 (7) , A352-A355.

Dong-Han Kim and Jaekook Kim, "Synthesis of LiFePO4 Nanoparticles in Polyol Medium and Their Electrochemical Properties," Electrochemical and Solid-State Letters; 2006, 9 (9) , A439-A442.

(Continued)

*Primary Examiner* — Ula C Ruddock
*Assistant Examiner* — Tony Chuo
(74) *Attorney, Agent, or Firm* — Muncy, Geissler, Olds & Lowe, P.C.

(57) ABSTRACT

$LiFePO_4$ flakes for a Li-ion battery and a method for manufacturing the same are disclosed. The $LiFePO_4$ flakes of the present invention have a thickness of 5 nm-200 nm, and the angle between the flat surface normal of the flake and the Li-ion diffusion channel is 0°-80°. In addition, according to the present invention, the $LiFePO_4$ flakes with short Li ion diffusion path can be prepared through a simple process. Hence, not only the charge-discharge efficiency of the Li-ion battery can be improved by use of the $LiFePO_4$ flakes of the present invention, but also the cost of the Li-ion battery can be further reduced.

3 Claims, 5 Drawing Sheets

(56) References Cited

OTHER PUBLICATIONS

M. Saiful Islam, Daniel J. Driscoll, Craig A. J. Fisher and Peter R. Slater, "Atomic-Scale Investigation of Defects, Dopants, and Lithium Transport in the LiFePO4 Olivine-Type Battery Material," Chemistry of Materials Review; 2005, 17,p. 5085-5092.

Pierre Gibot, Montse Casas-Cabanas, Lydia Laffont, Stephane Levasseur, Philippe Carlach, Stéphane Hamelet, Jean-Marie Tarascon and Christian Masquelier, "Room-temperature single-phaseLi insertion/extraction in nanoscale LixFePO4," nature materials; 2008, p. 741-747.

Fei Teng, Sunand Santhanagopalan, Anjana Asthana, Xiaobao Geng, Sun-il Mho, Reza Shahbazian-Yassar, Dennis Desheng Meng,"Self-assembly of LiFePO4 nanodendrites in a novel system of ethylene glycol-water," Journal of Crystal Growth; 2010, p. 3493-3502.

Yongmin Wu, Zhenhai Wen and Jinghong Li, "Hierarchical Carbon-Coated LiFePO 4 Nanoplate Microspheres with High Electrochemical Performance for Li-Ion Batteries," Advance Materials; 2011, p. 1126-1129.

Dinesh Rangappa,Koji Sone, Tetsuichi Kudo and Itaru Honma, "Directed growth of nanoarchitectured LiFePO4 electrode by solvothermal synthesis and their cathode properties," Journal of Power Sources; 2010, p. 6167-6171.

Hui Yang, Xing-Long Wu, Min-Hua Cao and Yu-Guo Guo, "Solvothermal Synthesis of LiFePO4 Hierarchically Dumbbell-Like Microstructures by Nanoplate Self-Assembly and Their Application as a Cathode Material in Lithium-Ion Batteries," The Journal of Physical Chemistry; 2009, p. 3345-3351.

Lianxing Li, Xincun Tang, Hongtao Liu,Yi Qu and Zhouguang Lu, "Morphological solution for enhancement of electrochemical kinetic performance of LiFePO4," Electrochimica Acta; 2010, p. 995-999.

Chunwen Sun, Shreyas Rajasekhara, John B. Goodenough and Feng Zhou, "Monodisperse Porous LiFePO4 Microspheres for a High Power Li-Ion Battery Cathode," Journal of the American Chemical Society; 2011,p.2132-2135.

Chuying Ouyang, Siqi Shi, Zhaoxiang Wang, Xuejie Huang and Liquan Chen, "First-principles study of Li ion diffusion in LiFePO4," Physical Review; 2004, 104303-1-104303-5.

Donghan Kim,Jinsub Lim, Eunseok Choi,Jihyeon Gim, Vinod Mathew, Younkee Paik,Hongryun Jung, Wanjim Lee, Docheon Ahn,Seungmin Paek and Jaekook Kim, "Synthesis of Highly Crystalline Olivine-Type LiFePO4 Nanoparticles by Solution-Based Reactions," Surface Review and Letters; 2010; vol. 17, Iss. 1, p. 111-119.

G. Meligrana, C. Gerbaldi, A. Tuel, S. Bodoardo, N. Penazzi,"Hydrothermal synthesis of high surface LiFePO4 powders as cathode for Li-ion cells," Journal of Power Sources; 2006, p. 516-522.

Nan et al., "Solvothermal synthesis of lithium iron phosphate nanoplates", Journal of Materials Chemistry, 2011, pp. 9994-9996, vol. 21.

Lou et al., "Synthesis of LiFePO4/C Cathode materials with both high-rate capability and high tap density for lithium-ion batteries", Journal of Materials Chemistry, 2011, pp. 4156-4160, vol. 21.

* cited by examiner

LIFEPO4 FLAKES FOR LI-ION BATTERY AND METHOD FOR MANUFACTURING THE SAME

CROSS REFERENCE TO RELATED APPLICATION

This application claims the benefits of the Taiwan Patent Application Serial Number 100121791, filed on Jun. 22, 2011, the subject matter of which is incorporated herein by reference.

BACKGROUND OF THE INVENTION

1. Field of the Invention

The present invention relates to $LiFePO_4$ flakes and a method for manufacturing the same, more particularly, to $LiFePO_4$ flakes for a Li-ion battery and a method for manufacturing the same.

2. Description of Related Art

As the development of various portable electronic devices continues, more and more attention focuses on the techniques of energy storage, and batteries are the main power supplies for these portable electronic devices. Among commercial batteries, small-sized secondary batteries are especially the major power supplies for portable electronic devices such as cell phones and notebooks. In addition, secondary batteries are applied to not only portable electronic devices, but also electric vehicles.

Among the developed secondary batteries, the lithium secondary batteries (also named as the Li-ion batteries) developed in 1990 are the most popular batteries used nowadays. The cathode material of the initial lithium secondary batteries is $LiCoO_2$. $LiCoO_2$ has the properties of high working voltage and stable charging and discharging voltage, so the secondary batteries which use $LiCoO_2$ as a cathode material are widely applied to portable electronic devices. Then, $LiFePO_4$ with an olivine structure and $LiMn_2O_4$ with a spinal structure were also developed as a cathode material for lithium secondary batteries. Compared to $LiCoO_2$, the safety of the batteries can be improved, the charge/discharge cycles can be increased, and the cost can be further reduced when LiFePO4 or $LiMn_2O_4$ is used as cathode material of secondary batteries.

Although the batteries which use $LiMn_2O_4$ as cathode materials have low cost and improved safety, the spinal structure of $LiMn_2O_4$ may collapse during the deep discharge process, due to Jahn-Teller effect. In this case, the cycle performance of the batteries may further degrade. When $LiFePO_4$ is used as cathode material of batteries, the batteries also have the properties of low cost and improved safety. In addition, the capacity of $LiFePO_4$ is higher than that of $LiMn_2O_4$, so the batteries made from $LiFePO_4$ can further be applied to devices, which need large current and high power. Furthermore, $LiFePO_4$ is a non-toxic and environmentally friendly material, and also has great high temperature characteristics. Hence, $LiFePO_4$ is considered as an excellent cathode material for lithium batteries. Currently, the average discharge voltage of the lithium batteries using $LiFePO_4$ as a cathode material is 3.4~3.7 V vs. $Li^+/Li$.

A conventional structure of the Li-ion batteries comprises: a cathode, an anode, a separator, and a Li-containing electrolyte. The batteries perform the charge/discharge cycles by the lithium insertion and extraction mechanism, which is represented by the following equations (I) and (II).

When a charge process of the batteries is performed, Li ions extract from the structure of $LiFePO_4$; and the Li ions insert into the structure of $FePO_4$ when a discharge process is performed. Hence, the charge/discharge process of the Li-ion batteries is a two-phase process of $LiFePO_4/FePO_4$. However, the diffusion rate of the Li ions in $LiFePO_4$ and $FePO_4$ is quite low, so some metal dopants may generally be added into the cathode materials to increase the diffusion rate of the Li ions. In addition, the Li-ion diffusion path of the currently used $LiFePO_4$ is long, so the conductivity of $LiFePO_4$ is not good enough. Hence, the $LiFePO_4$ powders may be coated with carbon to increase the conductivity of $LiFePO_4$ powders, in order to increase the charge/discharge efficiency of the batteries. However, the process for manufacturing $LiFePO_4$ powders becomes more complicated when the $LiFePO_4$ powders are doped with metal additives or coated with carbon. In this case, the cost of the batteries is also increased.

Currently, the $LiFePO_4$ powders are usually prepared by a solid-state process. However, the property of the product is highly related to the sintering temperature of the solid-state process. When the sintering temperature is below 700° C., all the raw materials have to be mixed well. If the raw materials are not mixed well, $Fe^{3+}$ impurity phase will be present in the $LiFePO_4$ powders. When sintering temperature is below 600° C., the average grain size of the $LiFePO_4$ powders will be smaller than 30 μm. However, if the sintering temperature is increased, the average grain size of the $LiFePO_4$ powders will be larger than 30 μm. When the average grain size of the $LiFePO_4$ powders is larger than 30 μm, a grinding process and a sieving process have to be performed to obtain powders with grain size between 1 μm to 10 μm. Hence, it is difficult to prepare $LiFePO_4$ powders with nano-size by the use of the solid-state process.

Therefore, it is desirable to provide a method for manufacturing nano-sized cathode materials of Li-ion batteries in a simple way, in order to increase the charge/discharge efficiency of the batteries and reduce the cost thereof.

SUMMARY OF THE INVENTION

The object of the present invention is to provide $LiFePO_4$ flakes with a short (Li-ion) diffusion path for use in Li-ion batteries. Hence, the charge/discharge efficiency of the Li-ion battery can further be increased.

Another object of the present invention is to provide a method for manufacturing $LiFePO_4$ flakes for a Li-ion battery. $LiFePO_4$ flakes with a short Li-ion diffusion path can be obtained through a simple process by using the method of the present invention, so the cost of the Li-ion batteries can be reduced.

To achieve the object, the present invention provides $LiFePO_4$ flakes, which have flat shapes, for use in a Li-ion battery. In addition, the thickness of the $LiFePO_4$ flakes is 5 nm-200 nm, and an angle between a flat surface normal of the $LiFePO_4$ flakes and a Li-ion diffusion channel is 0°-80°. According to the present invention, the term "normal" means the line, which is perpendicular to the flat surface of the $LiFePO_4$ flakes.

In addition, the present invention also provides a method for manufacturing the aforementioned $LiFePO_4$ flakes, which comprises the following steps: (A) providing a mixed organic solution which comprises Li, Fe, and P, wherein the Li contained in the mixed organic solution is derived from a Li-containing precursor or a P and Li-containing precursor, the Fe contained in the mixed organic solution is derived from an Fe-containing precursor or a P and Fe-containing precursor, and the P contained in the mixed solution is derived from a P-containing precursor, a P and Li-containing precursor, or a P and Fe-containing precursor; (B) heating the organic mixed solution to obtain preliminary products; and (C) heat-treating the preliminary products to obtain LiFePO$_4$ flakes.

According to the LiFePO$_4$ flakes for the Li-ion battery and the method for manufacturing the same of the present invention, precursors contained in the organic mixed solution are reacted with each other, and then the LiFePO$_4$ flakes can further be obtained after heat treatment. In addition, the obtained LiFePO$_4$ flakes of the present invention have an ordered crystal lattice and a short Li-ion diffusion path. The obtained LiFePO$_4$ flakes of the present invention have flat shapes, even petal-like shapes, so the thickness of the flakes is very thin. Therefore, the insertion and extraction path of the Li ions can be greatly shortened, and the diffusion rate of the Li ions can further be increased. When the obtained LiFePO$_4$ flakes of the present invention are used as cathode materials of a Li-ion battery, the charge-discharge efficiency of the Li-ion battery can be increased due to the short Li-ion diffusion path. In addition, the efficiency of the Li-ion battery can be improved by using the LiFePO$_4$ flakes of the present invention without doping any additives or coating any conductive materials, so the cost for manufacturing the Li-ion batteries can be further reduced.

According to the LiFePO$_4$ flakes for the Li-ion battery of the present invention, an angle between a zone axis of the flat surface of the LiFePO$_4$ flakes and a b-axis [0, 1, 0] of the Li-ion diffusion channel is 0°-80°, so an angle between a flat surface normal of the LiFePO$_4$ flakes and a Li-ion diffusion channel is 0°-80°. Preferably, the angle between the zone axis of the flat surface of the LiFePO$_4$ flakes and the b-axis [0, 1, 0] of the Li-ion diffusion channel is 30°-65°, i.e. the angle between the flat surface normal of the LiFePO$_4$ flakes and the Li-ion diffusion channel is 30°-65°. More preferably, the angle between the zone axis of the flat surface of the LiFePO$_4$ flakes and the b-axis [0, 1, 0] of the Li-ion diffusion channel is 45°-60°, i.e. the angle between the flat surface normal of the LiFePO$_4$ flakes and the Li-ion diffusion channel is 45°-60°.

Preferably, the zone axis of the flat surface of the LiFePO$_4$ flakes is close to [1, −3, 5].

In addition, according to the LiFePO$_4$ flakes for the Li-ion battery of the present invention, the width of the LiFePO$_4$ flakes is not particularly limited. Preferably, the width of the LiFePO$_4$ flakes is 500 nm-5 μm. More preferably, the width of the LiFePO$_4$ flakes is 1 μm-2.5 μm.

Furthermore, according to the LiFePO$_4$ flakes for the Li-ion battery of the present invention, the LiFePO$_4$ flakes have olivine structures.

According to the method for manufacturing the LiFePO$_4$ flakes of the present invention, a small amount of metal-containing compounds may be further added in the mixed organic solution in step (A), and the doped metal in the obtained LiFePO$_4$ flakes can increase the conductivity thereof. Herein, the doped metal can be at least one selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb. Preferably, the metal-containing compounds are sulfates, carbonates, nitrates, oxalates, acetates, chlorites, bromides, or iodides of the aforementioned doped metals. More preferably, the metal-containing compounds are sulfates of the aforementioned doped metals. Most preferably, the metal-containing compounds are sulfates of Mn, Cr, Co, Cu, Ni, Zn, Al, or Mg.

Hence, the obtained LiFePO$_4$ flakes of the present invention are represented by the following formula (I):

$$LiFe_{(1-x)}M_xPO_4 \qquad (I)$$

wherein, M can be one or more metals selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb, and 0≤x<0.5. Preferably, M is one or more metals selected from the group consisting of Mn, Cr, Co, Cu, Ni, Zn, Al, and Mg. More preferably, M is one or more metals selected from the group consisting of Mn, Cu, Zn, Al, Ni, and Mg.

In addition, according to the method for manufacturing the LiFePO$_4$ flakes of the present invention, a small amount of carbon material may be further added in the mixed organic solution in step (A). In this case, the surfaces of the obtained LiFePO$_4$ flakes are coated with carbon, so the conductivity of the obtained LiFePO$_4$ flakes can further be increased. Herein, the carbon materials can be any sugar, such as sucrose. In addition, the additive amount of the carbon material can be 0.1 wt %-20 wt % of the weight of the obtained LiFePO$_4$ flakes.

According to the method for manufacturing the LiFePO$_4$ flakes of the present invention, the Li-containing precursor can be at least one selected from the group consisting of LiOH, Li$_2$CO$_3$, LiNO$_3$, CH$_3$COOLi, Li$_2$C$_2$O$_4$, Li$_2$SO$_4$, LiCl, LiBr, and LiI; the Fe-containing precursor can be at least one selected from the group consisting of FeCl$_2$, FeBr$_2$, FeSO$_4$, (NH$_4$)$_2$Fe(SO$_4$)$_2$, Fe(NO$_3$)$_2$, FeC$_2$O$_4$, (CH$_3$COO)$_2$Fe, and FeCO$_3$; the P-containing precursor can be at least one selected from the group consisting of H$_3$PO$_4$, NaH$_2$PO$_4$, Na$_2$HPO$_4$, Mg$_3$(PO$_4$)$_2$, and NH$_4$H$_2$PO$_4$; the P and Li-containing precursor can be at least one selected from the group consisting of LiH$_2$PO$_4$, Li$_2$HPO$_4$, and Li$_3$PO$_4$; and the P and Fe-containing precursor can be at least one selected from the group consisting of Fe$_3$(PO$_4$)$_2$, and FePO$_4$. According to the method for manufacturing the LiFePO$_4$ flakes of the present invention, the organic mixed solution not only contains the aforementioned precursors, but also may contain other additives such as surfactants, polymer electrolytes, and stabilizers, which can facilitate the synthesis reaction or the dissolution of the precursors. Herein, the examples of the surfactants can be Cetyltrimethylammonium bromide (CTAB), sodium dodecylbenzene sulfonate (SDBS), sodium dodecyl sulfate (SDS), or Triton-X100; the examples of the polymer electrolytes can be polyvinylpyrollidone (PVP), peroxyacetic acid (PAA), Polyethyleneimine (PFJ), or polyacrylamide (PAM); and the examples of the stabilizers can be Polyvinyl Alcohol (PVA), or polyvinyl acetate (PVAc). The aforementioned additives can control the crystal size and the preferential growth direction of the powders. In addition, in step (B) of the method of the present invention, an external electric field can be further applied to control the preferential growth direction of the crystal of the powders, in order to increase the area of the Li-ion transfer interface.

According to the method for manufacturing the LiFePO$_4$ flakes of the present invention, the organic solvent in the mixed organic solution can be any media generally used in the art, and can be any polyol organic solvents generally used in the art. Preferably, the organic solvent is at least one selected from the group consisting of ethylene glycol (EG), diethylene glycol (DEG), glycerol, triethylene glycol (TEG), tetraethylene glycol (TTEG), polyethylene glycol (PEG), Dimethyl sulfoxide (DMSO), and N,N-dimethylmethanamide (DMF). More preferably, the organic solvent used in the method of the present invention is DEG, glycerol, or a combination thereof.

Furthermore, according to the method for manufacturing the LiFePO$_4$ flakes of the present invention, the organic mixed solution can be reacted through a hydrothermal process, a solvothermal process, a reflux process, or a co-precipitation process, in step (B). Preferably, the organic mixed solution is reacted by reflux. Herein, the reaction temperature of reflux is 105° C.-350° C., and the reaction thereof is 10 hrs-20 hrs, preferably.

In addition, according to the method for manufacturing the LiFePO$_4$ flakes of the present invention, the organic mixed solution may be heated and reacted under an atmosphere or with an introduced gas flow to obtain the preliminary products in step (B). Herein, the atmosphere or the introduced gas flow can be used as a protective gas or a reducing gas, which may comprise one selected from the group consisting of N$_2$, H$_2$, He, Ne, Ar, Kr, Xe, CO, methane, N$_2$—H$_2$ mixture, and a mixture thereof. Preferably, the protective gas or the reducing gas is N$_2$, H$_2$, or N$_2$—H$_2$ mixture. More preferably, the protective gas or the reducing gas is N$_2$—H$_2$ mixture.

According to the method for manufacturing the LiFePO$_4$ flakes of the present invention, the preliminary products may be heat-treated under an atmosphere or with an introduced gas flow to obtain the LiFePO$_4$ flakes in step (C). Herein, the atmosphere or the introduced gas flow can also be used as a protective gas or a reducing gas, which may comprise one selected from the group consisting of N$_2$, H$_2$, He, Ne, Ar, Kr, Xe, CO, methane, N$_2$—H$_2$ mixture, and a mixture thereof. Preferably, the protective gas or the reducing gas is N$_2$, H$_2$, or N$_2$—H$_2$ mixture. More preferably, the protective gas or the reducing gas is N$_2$—H$_2$ mixture.

In step (C) of the method for manufacturing the LiFePO$_4$ flakes of the present invention, the preliminary products are heat-treated at 300° C.-700° C., preferably. In addition, the preliminary products are preferably heat-treated for 1 hr-20 hrs.

In addition, the obtained LiFePO$_4$ flakes of the present invention can be used as a cathode material to prepare a Li-ion battery, through any conventional method in the art. Here, the method for manufacturing the Li-ion battery is briefly described, but the present invention is not limited thereto.

An anode current collector is coated with a carbon material, and then the carbon material is dried and pressed to form an anode for the Li-ion battery. A cathode current collector is coated with a cathode active material (i.e. the LiFePO$_4$ of the present invention), and then the cathode active material is dried and pressed to form a cathode for the Li-ion battery. Next, a separator is inserted between the cathode and the anode, a Li-containing electrolyte is injected, and a Li-ion battery is obtained after packaging.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Embodiment 1

The precursors of H$_3$PO$_4$, FeC$_2$O$_4$, and LiOH were mixed in a ratio of 1:1:1, and dissolved in DEG (300 ml) to obtain a mixed organic solution (0.15 M). Next, the mixed organic solution was reacted by reflux at 200° C., under an atmosphere of N$_2$—H$_2$ mixture for 18 hrs. After the mixed organic solution was filtrated, preliminary products were obtained. Then, the preliminary products were heat-treated at 500° C., under an atmosphere of N$_2$ gas for 2 hrs to obtain LiFePO$_4$ flakes of the present embodiment.

The preliminary products before heat-treatment of the present embodiment were examined by an X-ray diffractometer (Shimadzu 6000) to obtain the crystal structure thereof. The X-ray diffraction pattern was obtained by applying Cu Kα radiation, the 2θ-scanning angle is 15°-45°, and the scanning rate is 1°/min. The obtained XRD diffraction patterns are shown in FIGS. 1A and 1B, wherein FIG. 1A is an XRD diffraction pattern of preliminary products before heat-treatment, and FIG. 1B is an XRD diffraction pattern of LiFePO$_4$ flakes.

Figure 1A:
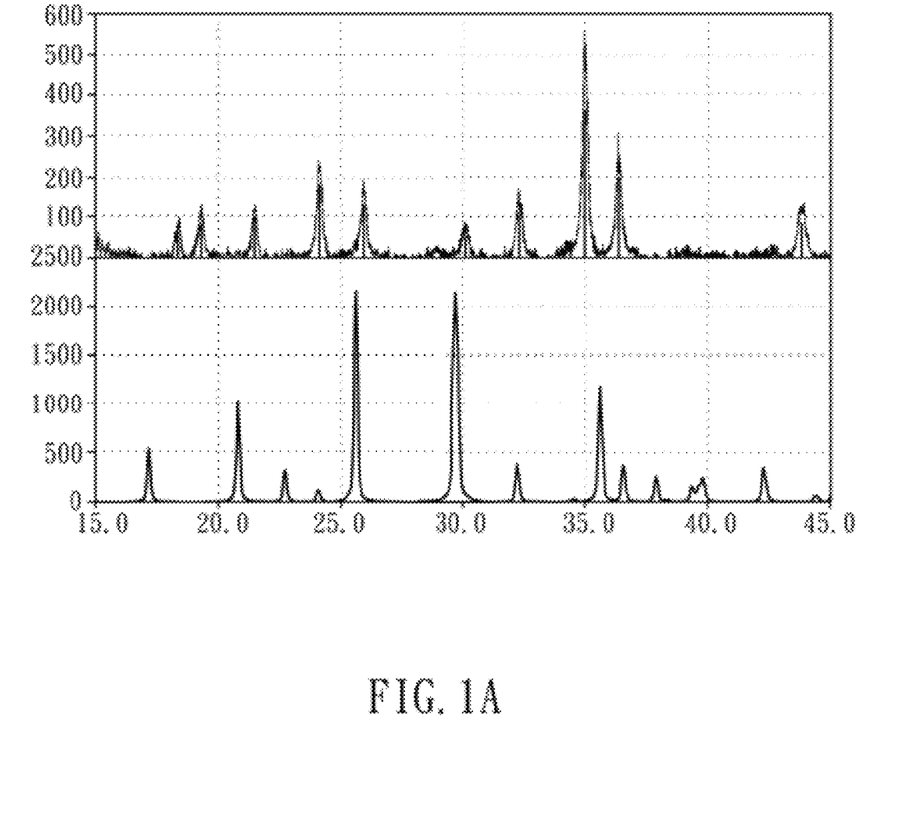
FIG. 1A is an XRD diffraction pattern of preliminary products before heat-treating process according to Embodiment 1 of the present invention.
Figure 1B:
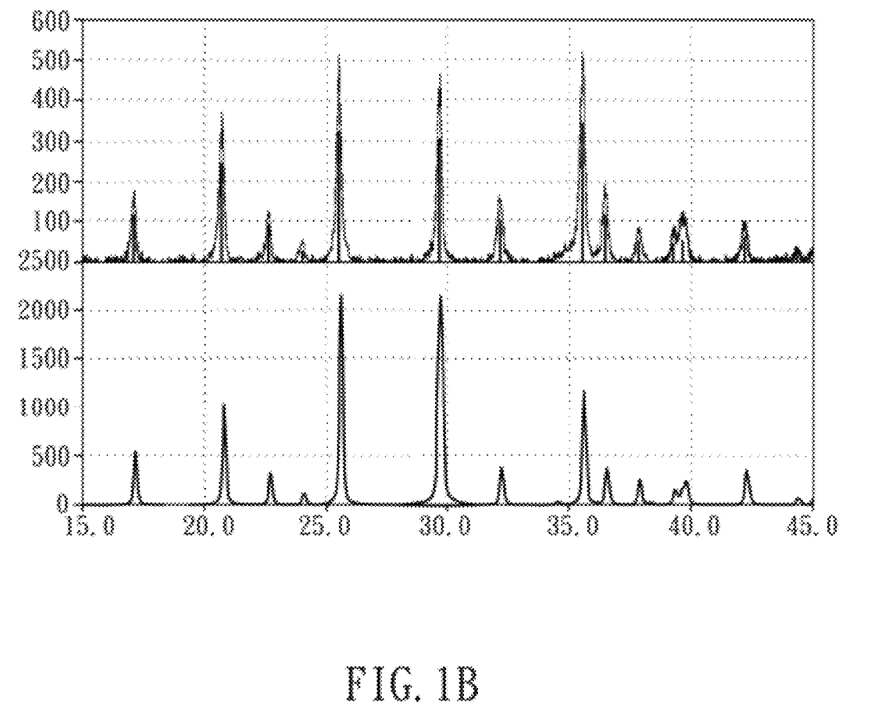
FIG. 1B is an XRD diffraction pattern of LiFePO$_4$ flakes according to Embodiment 1 of the present invention.

According to FIGS. 1A and 1B, the upper figures are the XRD diffraction patterns of the preliminary products and the LiFePO$_4$ flakes of the present embodiment, and the lower figures are the XRD diffraction patterns of LiFePO$_4$ crystal with an olivine structure (JCPDS No. 81-1173). As shown in the upper figures of FIGS. 1A and 1B, lines are used to indicate the position of the peaks.

As shown in FIG. 1A, the preliminary products before heat-treatment do not have olivine structures. On the contrary, as shown in FIG. 1B, the lines indicating the peaks of the LiFePO$_4$ flakes of the present embodiment correspond to the peaks of LiFePO$_4$ crystal with the olivine structure (JCPDS No. 81-1173), and there are no other peaks observed in the LiFePO$_4$ flakes of the present embodiment. This result indicates that all the LiFePO$_4$ flakes of the present embodiment are LiFePO$_4$ flakes with olivine structures.

Figure 2A:
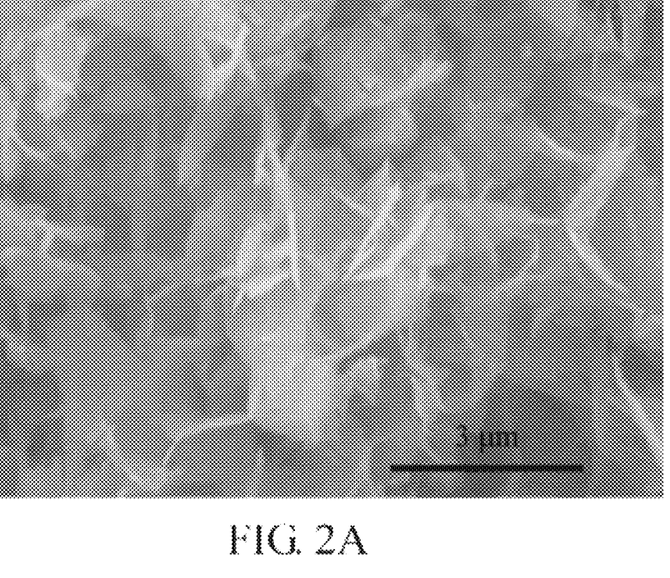
FIGS. 2A and 2B are SEM photos of LiFePO$_4$ flakes according to Embodiment 1 of the present invention.
Figure 2B:
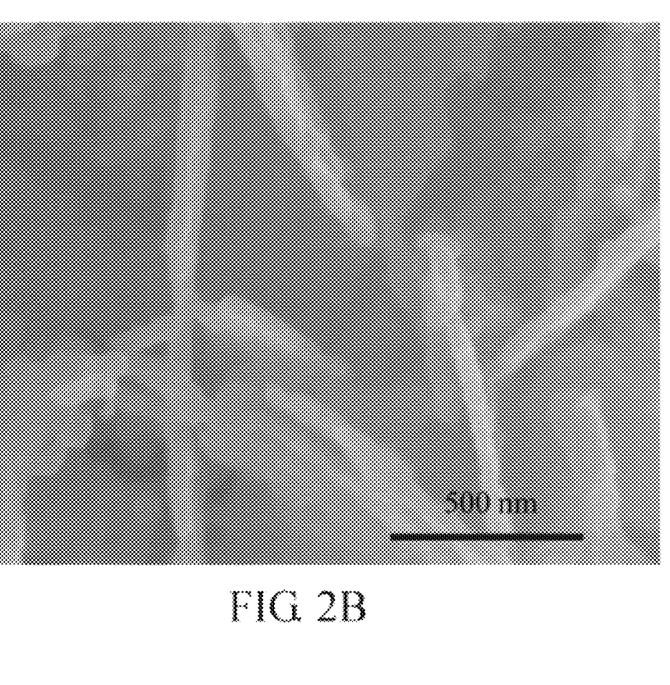

In addition, the shapes of the LiFePO$_4$ flakes of the present embodiment were observed with a scanning electron microscope (SEM) (Hitachi S-4000), and the results are shown in FIGS. 2A and 2B. As shown in FIG. 2A, the LiFePO$_4$ flakes have flat shapes (also named as petal-like shapes), and the width of each flake is 2 μm, when the LiFePO$_4$ flakes were observed at the magnification of 100000×. As shown in FIG. 2B, when the LiFePO$_4$ flakes were observed at the magnification of 600000×, it can be observed that the thickness of each flake is 50 nm, and the width of the surface of each flake is 40 folds of the thickness of each flake.

Furthermore, a transmission electron microscope (TEM) (JEOL 2010) was used to observe the single-crystal diffraction of the powders. The result shows that the zone axis of the LiFePO$_4$ flakes of the present embodiment is close to [1, −3, 5], and the angle between the zone axis [1, −3, 5] and the surface normal of each diffraction planes is in a range from 89.33° to 90.33°. After calculation, the angle between the zone axis [1, −3, 5] and a b-axis [0, 1, 0] of the Li-ion diffusion channel is 54.93°, which is obtained by the following equations:

$$[1, -3, 5] \cdot [0,1,0] = |[1, -3, 5]| \times |[0,1,0]| \times \cos\theta$$

$$\cos\theta = \frac{-3b^2}{\sqrt{a^2 + 9b^2 + 25c^2} \times \sqrt{b^2}} = -0.5753$$

wherein, a is 10.33 Å, b is 6.01 Å, c is 4.692 Å, and a, b and c are respectively the length of the unit vector along the x, y and z crystal axes of the LiFePO$_4$ flakes. After calculation, θ is 125.07°, which can be taken into) 54.93° (180°−125.07°=54.93°.

Figure 3:
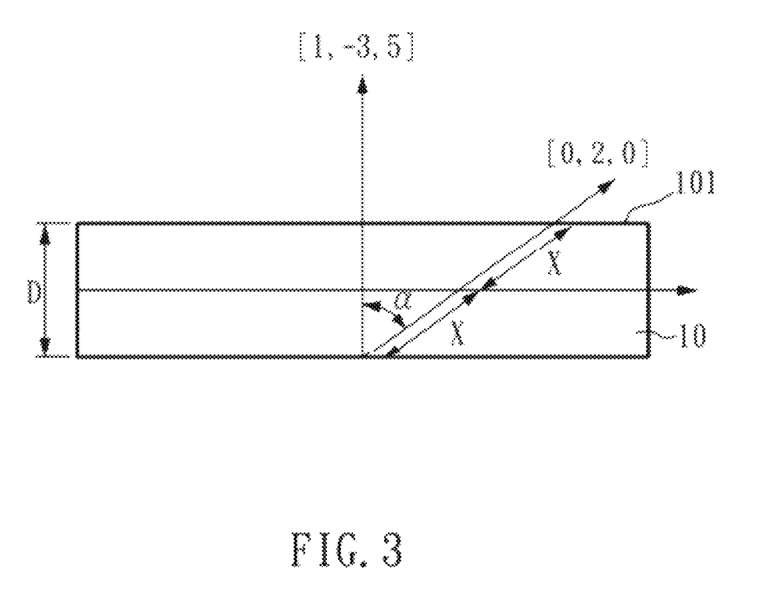
FIG. 3 is a schematic drawing of the Li ion diffusion path of LiFePO$_4$ flakes according to Embodiment 1 of the present invention.

In other words, as shown in FIG. 3, the angle α between the Li-ion diffusion channel and the normal of the surface 101 of the flake of the LiFePO$_4$ flakes 10 of the present embodiment is 54.93°. The longest diffusion path x for the Li-ion to leave the LiFePO$_4$ flakes with the thickness D of 50 nm is (50 nm/(2× cos 54.93°)=43.5 nm Embodiment 2

The precursors of H$_3$PO$_4$, FeSO$_4$, and Li$_2$CO$_3$ (1:1:1) and urea with the same molar amount were dissolved in DEG (300 ml) to obtain a mixed organic solution (0.3 M). Next, the mixed organic solution was reacted by reflux at 200° C., under an atmosphere of N$_2$—H$_2$ mixture for 14 hrs. After the mixed organic solution was filtrated, preliminary products were obtained. Then, the preliminary products were heat-treated at 500° C., under an atmosphere of N$_2$ gas for 10 hrs to obtain LiFePO$_4$ flakes of the present embodiment.

The LiFePO$_4$ flakes of the present embodiment were examined with an X-ray diffractometer, a scanning electron microscope, and a transmission electron microscope by the same methods as disclosed in Embodiment 1. The result of the X-ray diffraction shows that the LiFePO$_4$ flakes of the present embodiment have olivine structures. The result of SEM shows that the LiFePO$_4$ flakes of the present embodiment have flat shapes, the width of each flake is 1-1.5 μm, the thickness thereof is 20-35 nm, and the width of the surface is 43-50 folds of the thickness thereof.

In addition, the result of TEM shows that the angle between the zone axis and the surface normal of each diffraction planes of the LiFePO$_4$ flakes of the present embodiment is in a range from 89.33° to 90.33°. The angle between the zone axis [1, −3, 5] and the b-axis [0, 1, 0] of the Li-ion diffusion channel is calculated to be 54°.

Embodiment 3

The precursors of H$_3$PO$_4$, FeC$_2$O$_4$, and LiOH were mixed with a ratio of 1:1:1, and dissolved in DEG (300 ml) to obtain a mixed organic solution (0.15 M). Next, SDS was added into the mixed organic solution, and the mixed organic solution was reacted by reflux at 200° C., under an atmosphere of N$_2$ gas for 10 hrs. After the mixed organic solution was filtrated, preliminary products were obtained. Then, the preliminary products were heat-treated at 500° C., under an atmosphere of N$_2$ gas for 4 hrs to obtain LiFePO$_4$ flakes of the present embodiment.

Figure 4:
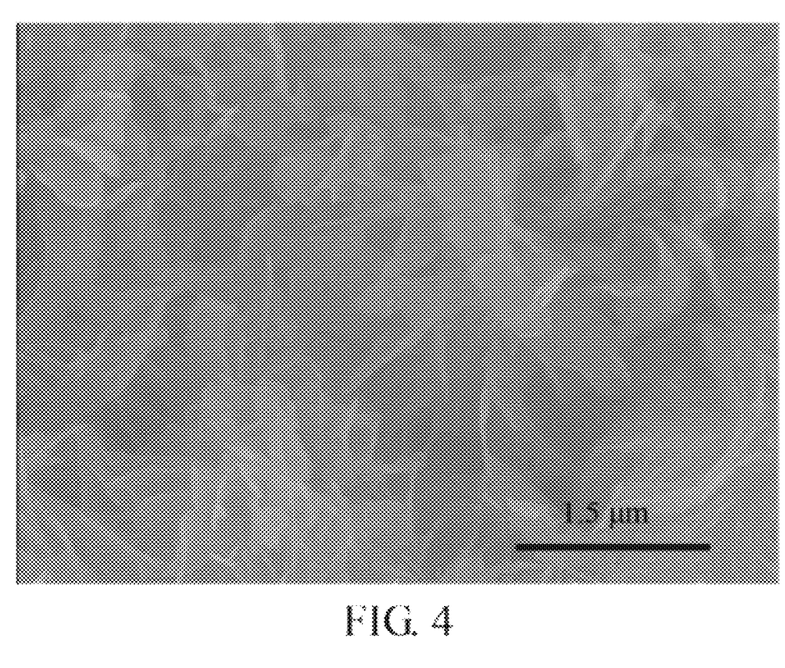
FIG. 4 is SEM photo of LiFePO$_4$ flakes according to Embodiment 3 of the present invention.

The shapes of the LiFePO$_4$ flakes of the present embodiment were observed with a scanning electron microscope (SEM). As shown in FIG. 4, the LiFePO$_4$ flakes have flat shapes (also named as petal-like shape) and bundle like a rose, and the thickness of each flake is thin and uniform, when the LiFePO$_4$ flakes were observed at the magnification of 100000×. In addition, the SEM result also shows that the dispersion of the LiFePO$_4$ flakes of the present embodiment is better than that of Embodiment 1.

According to the results of Embodiments 1 to 3, the LiFePO$_4$ flakes of the present invention have unique shapes, so the distribution density of the Li-ion diffusion channel is the highest. In addition, the LiFePO$_4$ flakes of the present invention are flakes, so Li ions can extract from the powders in a uniform and high-density manner. Therefore, the current density of the Li-ion batteries can be further increased by the use of the LiFePO$_4$ flakes of the present invention.

Furthermore, the length of the Li-ion diffusion channel is similar to the thickness of the LiFePO$_4$ flakes of the present invention, so Li ions can quickly diffuse inside the powders. Even though there are no metal additives doped into the LiFePO$_4$ flakes of the present invention, the high diffusion rate of the Li ions can still be maintained. In addition, the number of Li ions extracting from the powders is not significantly reduced over time, so an almost constant charge/discharge current can be obtained. Therefore, even if the charge/discharge time is increased, the problem of the reduction of charge/discharge current can be prevented by the use of the LiFePO$_4$ flakes of the present invention.

In addition, the length of the Li-ion diffusion channel according to the LiFePO$_4$ flakes of the present invention is in nano scale, so the problem of low conductivity can be avoided. Hence, when the LiFePO$_4$ flakes of the present invention are applied to Li-ion batteries, cathode materials with high conductivity can be obtained without carbon coating.

In conclusion, according to the LiFePO$_4$ flakes and the method for manufacturing the same of the present invention, the thickness of the obtained LiFePO$_4$ flakes is only of nano scale. Even though there are no metal additives doped into the LiFePO$_4$ flakes or no carbon coated on the surface of the LiFePO$_4$ flakes, the charge/discharge character of the batteries can still be improved. In addition, the process of the method for manufacturing the LiFePO$_4$ flakes of the present invention is simple. Therefore, when the LiFePO$_4$ flakes of the present invention are applied to Li-ion batteries, the cost thereof can be further decreased.

Although the present invention has been explained by its preferred embodiment, it is to be understood that many other possible modifications and variations can be made without departing from the spirit and scope of the invention as hereinafter claimed.

What is claimed is:

1. LiFePO$_4$ flakes for a Li-ion battery, wherein the thickness of the flakes is 5 nm-200 nm and the width of the LiFePO$_4$ flakes is 1 μm-5 μm, and an angle between a flat surface normal of the LiFePO$_4$ flakes and a Li-ion diffusion channel is 30°-65°; wherein the LiFePO$_4$ flakes have petal shapes.

2. The LiFePO$_4$ flakes as claimed in claim 1, wherein a width of the LiFePO$_4$ flakes is 1 μm-2.5 μm.

3. The LiFePO$_4$ flakes as claimed in claim 1, wherein the LiFePO$_4$ flakes have olivine structures.

* * * * *